United States Patent
Jung et al.

(10) Patent No.: US 9,601,797 B2
(45) Date of Patent: Mar. 21, 2017

(54) FUEL CELL STACK MANIFOLD WITH EJECTOR FUNCTION

(71) Applicant: Hyundai Motor Company, Seoul (KR)

(72) Inventors: Se Kwon Jung, Gyeonggi-Do (KR); Duck Whan Kim, Seoul (KR); Yong Gyu Noh, Gyeonggi-Do (KR); Bu Kil Kwon, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 94 days.

(21) Appl. No.: 14/520,071

(22) Filed: Oct. 21, 2014

(65) Prior Publication Data

US 2015/0214566 A1 Jul. 30, 2015

(30) Foreign Application Priority Data

Jan. 28, 2014 (KR) ........................ 10-2014-0010086

(51) Int. Cl.
*H01M 2/38* (2006.01)
*H01M 8/2485* (2016.01)
*H01M 8/04089* (2016.01)
*H01M 8/124* (2016.01)

(52) U.S. Cl.
CPC ..... *H01M 8/2485* (2013.01); *H01M 8/04097* (2013.01); *H01M 2008/1293* (2013.01); *H01M 2250/20* (2013.01); *Y02E 60/50* (2013.01); *Y02E 60/525* (2013.01); *Y02P 70/56* (2015.11); *Y02T 90/32* (2013.01)

(58) Field of Classification Search
CPC ........... H01M 8/04097; H01M 8/2485; H01M 2008/1293; H01M 2250/20; Y02T 90/32; Y02E 60/50; Y02E 60/525; Y02P 70/56

USPC ......................................................... 420/458
See application file for complete search history.

(56) References Cited

U.S. PATENT DOCUMENTS

| | | | |
|---|---|---|---|
| 3,982,961 A | 9/1976 | Grasso | |
| 2010/0143754 A1* | 6/2010 | Greszler | H01M 8/04097 |
| | | | 429/458 |

FOREIGN PATENT DOCUMENTS

| | | |
|---|---|---|
| JP | 07-176315 | 7/1995 |
| JP | 2003-317758 | 11/2003 |
| JP | 2009238596 A * | 10/2009 |
| KR | 10-0962903 | 6/2009 |
| KR | 10-1054837 | 8/2011 |
| KR | 10-2012-0136708 A | 12/2012 |
| KR | 10-1403173 B1 | 6/2014 |
| WO | 2011/071466 A1 | 6/2011 |

* cited by examiner

*Primary Examiner* — Gary Harris
(74) *Attorney, Agent, or Firm* — Mintz Levin Cohn Ferris Glovsky and Popeo, P.C.; Peter F. Corless

(57) ABSTRACT

A fuel cell stack manifold having an ejector function of which the manufacturing cost and the weight can be reduced by optimizing hydrogen supply and recirculation channels and removing other members. hardware without a separate ejector structure for additionally attaching an ejector, of which the productivity can be improved by removing from an ejector assembly process. The fuel cell system minimizes joints through which hydrogen may leak, by implementing a new structure of a manifold added with an ejector function by integrally forming/manufacturing a stack manifold having a venturi and diffuser structure and adding a nozzle thereto.

8 Claims, 3 Drawing Sheets

FUEL CELL STACK MANIFOLD WITH EJECTOR FUNCTION

CROSS-REFERENCE TO RELATED APPLICATION

This application claims under 35 U.S.C. §119(a) the benefit of Korean Patent Application 10-2014-0010086 filed on Jan. 28, 2014, the entire contents of which are incorporated herein by reference.

BACKGROUND (a) Technical Field

The present invention relates to a fuel cell stack manifold supplying and distributing hydrogen, air, and cooling water for operating a stack, and more particularly to a fuel cell stack manifold including an ejector for recirculating a stack exhaust gas.

(b) Background Art

In general, a fuel cell is a kind of power generator that converts the chemical energy of fuel into electric energy not by changing it into heat through combustion, but by electrochemically reacting it in a fuel cell stack. Such fuel cells can be used not only for supplying power for industry, homes, and vehicles, but also for supplying power to small electric/electronic products, particularly portable devices.

Automotive fuel cell systems generally include a fuel cell stack that generates electric energy, a fuel supply device that supplies fuel (e.g., hydrogen) to the fuel cell stack, an air supply device that supplies the hydrogen in the air which is an oxidizer for electrochemical reaction to the fuel cell stack, and a cooling system that removes the heat from the reaction of the fuel cell stack to an outside environment of the system and controls the operation temperature of the fuel cell stack.

Recently, typically a polymer electrolyte membrane fuel cell having high power density in fuel cells is used an automotive power source. Such a polymer electrolyte membrane fuel cell includes a membrane electrode assembly with a catalyst electrode layer, where an electrochemical reaction occurs, attached to both sides of a solid polymer electrolyte membrane through which hydrogen ions move, a gas diffusion layer that uniformly distributes a reaction gas and transmits generated electric energy, a bipolar plate that moves the reaction gas and cooling water along a reaction channel, and a gasket and a fastening mechanism that maintains airtightness for the reaction gas and the cooling water and appropriate fastening pressure.

Further, fuel cell stacks typically have a manifold that forms the inlet channel and the outlet channel of the stack. Manifold provide channels that the gases before and after a reaction and the cooling water flow in/out of.

These manifolds typically have long and complicated internal channels that that allow cooling water and gases to pass therethrough. When a plurality of stack modules are mounted on a fuel cell vehicle, the manifolds attached to the outer sides of the stack modules supply reaction gases (air and hydrogen) and cooling water to the stack modules, respectively. That is, a stack manifold is attached to an outer side of a fuel cell unit module and supplies fluid to a stack or restores it.

Channels through which fluids, that is, hydrogen and air (oxygen) and cooling water or cooling a stack, which are used in a stack, flow are formed in a stack manifold so that the fluids can be supplied to a fuel cell unit module or restored from it via the channels.

Fuel cell systems are also usually equipped with a recirculation system for re-supplying gases discharged from a stack, and to this end, a pump mechanism such as a recirculation blower and an ejector is often used.

For example, in fuel cell systems, it is required to supply hydrogen and oxygen in order to generate a current in a stack. When only the amount of hydrogen to be reacted in a stack is supplied, a sufficient reaction is not generated due to the deficit of density of hydrogen at the end of the reaction surface and uniformity of the fuel supplied to the stack decreases, such that the performance and stability of the stack may be deteriorated, and fuel is excessively supplied.

However, when the fuel remaining after a reaction is discharged, the fuel efficiency of a vehicle decreases, so it has been proposed to apply a recirculation technology of improving fuel efficiency by mixing the gas discharged from the anode of the stack with hydrogen sent out of a tank by recirculating the gas, and by supplying the mixture back to the stack.

Further, when the gas discharged from the stack is recirculated, the electrolyte membrane in the stack can be prevented from drying out by the moisture in the recirculated gas.

A pump circulating a gas is required to recirculate the gas discharged from the stack and hydrogen is recirculated usually by a recirculation blower (using a motor) and an ejector.

Various types of stack manifolds including an ejector for a recirculation system have been disclosed in Korean Patent Application Publication No. 2009-0094904, 10-2012-0136708 etc.

However, those conventional recirculation systems are problematic in that the volume and weight of the system increases and the structures are complicated, because there are needs of channels and members for attaching a pumping mechanism to a stack manifold.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

Accordingly, the present invention has been made in consideration of the problems and an object of the present invention is to provide a fuel cell stack manifold having an ejector function in which the manufacturing cost and the weight can be reduced by optimizing hydrogen supply and recirculation channels and removing other members and hardware without a separate ejector structure for additionally attaching an ejector, of which the productivity can be improved by removing an ejector assembly process. The present invention also can improve safety of a fuel cell system by minimizing joints through which hydrogen may leak, by implementing a new structure of a manifold including an ejector function by integrally forming/manufacturing a stack manifold having a venturi and diffuser structure and adding a nozzle thereto.

A fuel cell stack manifold having an ejector function provided by the present invention has the following characteristics. The fuel cell stack manifold, which is combined with a stack and supplies and distributes fuel, air, and cooling water for operating the stack, includes: a manifold body that has an anode outlet and an anode inlet; and an ejector that connects the anode outlet and the anode inlet.

The ejector is integrally formed with the manifold body, and includes a venturi, a diffuser, and a nozzle mounted on the venturi.

Accordingly, since the fuel cell stack manifold has the ejector structure integrated therein, it is possible to optimize the channels for supplying/recirculating hydrogen and the structure of an ejector or other related members can be removed, such that it is possible to reduce the manufacturing cost and weight.

The front end of the diffuser of the ejector may be connected directly to the anode inlet of the manifold body, the downstream side of the venturi may be connected to the anode outlet of the manifold body through a duct, and the ejector including the venturi and the diffuser may be arranged horizontally on the manifold body.

The upstream side of the diffuser of the ejector may be partially cut and the partially cut may be finished by a cap after the diffuser is machined.

In some embodiments, the nozzle of the ejector may be additionally mounted from the outside or is integrally formed with the stack manifold.

The manifold body and the ejector integrally formed with the manifold body may be formed by gravity casting or die casting, when they are made of metal. Further, the manifold body and the ejector integrally formed with the manifold body may be formed by blow molding or injection molding, when they are made of plastic.

A fuel cell stack manifold having an ejector function provided by the present invention has the following advantages.

First, since it is possible to remove an ejector that is a separate component of the manifold typically included in the fuel cell by providing an ejector function to a stack manifold itself, it is possible to reduce the manufacturing cost and simplify the manufacturing process.

Second, since there are no joints between the stack manifold and the ejector, it is possible to minimize the portions that need to be made hermetic and there is no need for a gasket and an assembly member for airtightness. Therefore, it is possible to reduce the manufacturing cost and weight.

Third, since the stack manifold and the ejector are integrally formed, heat exchange between them increases, such that it is possible to reduce freezing of the nozzle of the ejector in cold starting and to increase the temperature rising speed of the structure of the ejector.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
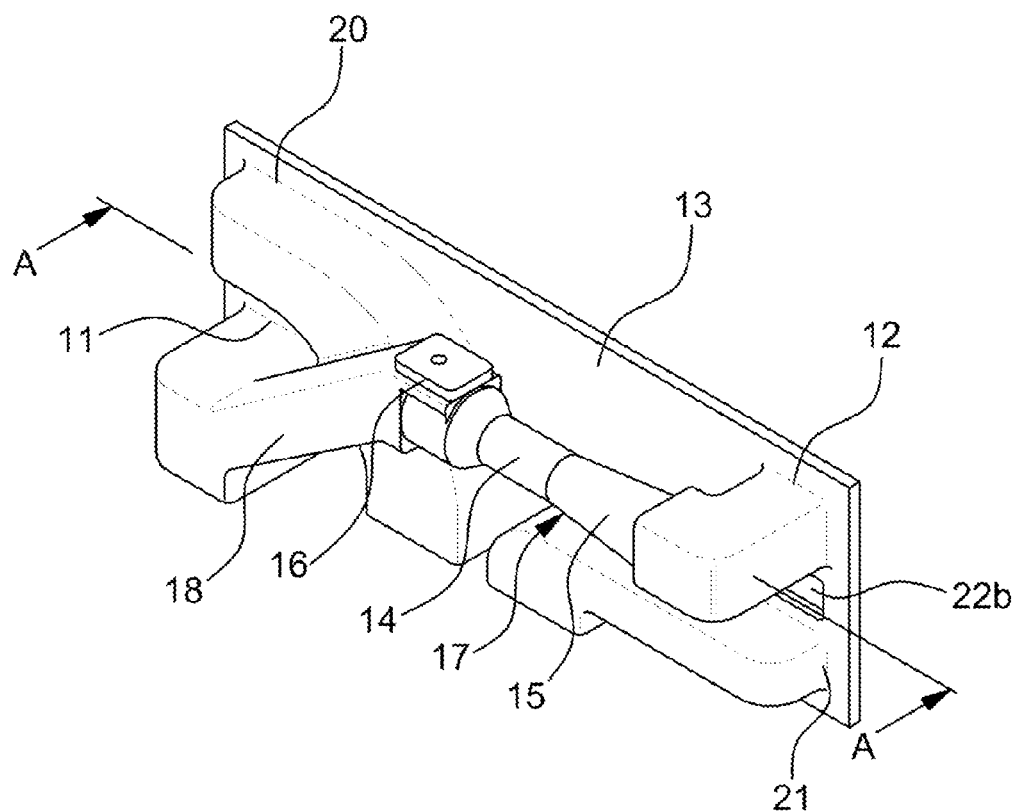
FIG. 1 is a perspective view showing a fuel cell stack manifold having an ejector function according to an exemplary embodiment of the present invention.

| | |
|---|---|
| 10: stack | 11: anode outlet |
| 12: anode inlet | 13: manifold body |
| 14: venturi | 15: diffuser |
| 16: nozzle | 17: ejector |
| 18: duct | 19: cap |
| 20: cathode inlet | 21: cathode outlet |
| 22a, 22b: cooling water channel | 23: hydrogen tank |
| 24: regulator | 25: flow control valve |
| 26: machining tool | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid fuel cell vehicles, electric vehicles, plug-in hybrid fuel cell electric vehicles, hydrogen-powered vehicles, fuel cell vehicles, etc.

EXAMPLES

Hereinafter, the present invention will be described more fully with reference to the accompanying drawings for those skilled in the art to easily implement the present invention.

Hereinafter, the present invention is described in detail with reference to the accompanying drawings.

Figure 2:
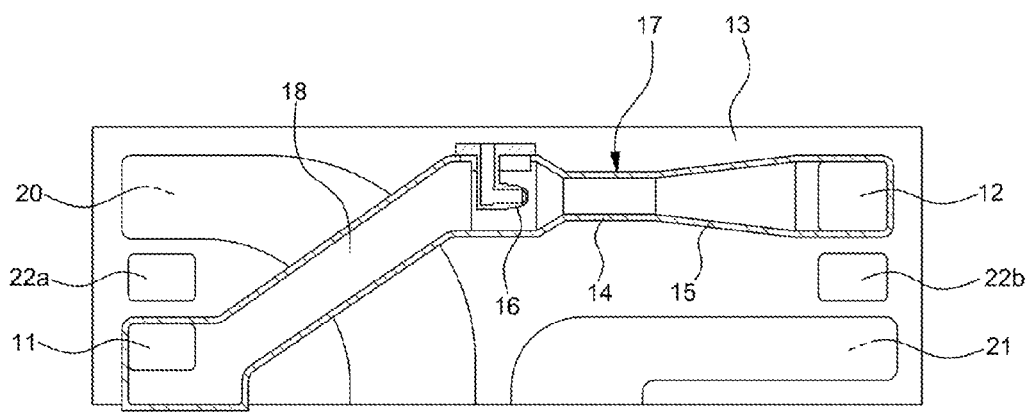
FIG. 2 is a cross-sectional view taken along line A-A of FIG. 1.
Figure 3:
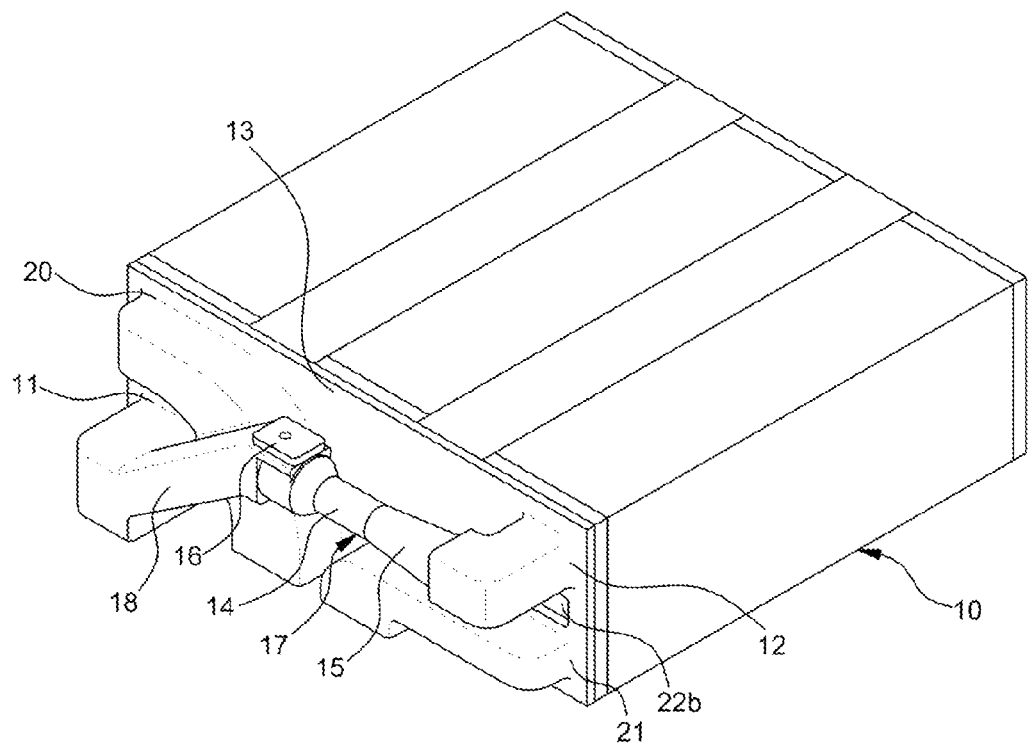
FIG. 3 is a perspective view showing an installation status of a fuel cell stack manifold having an ejector function according to an exemplary embodiment of the present invention.

FIGS. 1 and 2 are a perspective view and a cross-sectional view showing a fuel cell stack manifold having an ejector function according to an embodiment of the present invention and FIG. 3 is a perspective view showing an installation/configuration of a fuel cell stack manifold having an ejector function according to an exemplary embodiment of the present invention.

As shown in FIGS. 1 to 3, the fuel stack manifold, a unit coupled to a stack 10 to supply and distribute fuel, air, and cooling water for operation of a stack, has a structure of an integrated venturi-diffuser of an ejector in an anode line of the stack manifold.

To this end, a manifold body 12 of the stack manifold has an anode inlet 12 and anode outlet 11 for supplying and discharging fuel (hydrogen) to and from the stack 10, respectively, a cathode inlet 20 and a cathode outlet 21 for supplying and discharging air to and from the stack 10, respectively, and cooling channels 22a and 22b for supplying and discharging cooling water.

The manifold body 12 has a substantially rectangular plate shape with the cathode outlet 21 and the anode outlet 11 formed up and down at one longitudinal end of the body and the anode inlet 12 and the cathode inlet 20 formed up and down at the other longitudinal end of the body. The cooling channels 22a and 22b are formed between the anode inlet 12 and the cathode inlet 20 and between the cathode outlet 21 and the anode outlet 11, respectively.

The manifold body 12 having the anode inlet 12, anode outlet 11, cathode inlet 20, cathode outlet 21, and cooling water 22a, 22b are each attached in closed contact with the stack 10 and can supply fuel, oxygen, and cooling water.

In particular, the manifold body 12 has an integrated ejector 17, that is, a part that functions as an ejector is integrally formed with the manifold 12, such that a separate ejector that is typically used in the related art can be removed. To this end, the ejector 17 includes a venturi 14 and a diffuser 15, which are integrally formed with the manifold body 12.

A nozzle 16 for supplying hydrogen may be mounted on a front side of the venturi 14. The nozzle 16 is positioned inside the venturi 14 and can spray hydrogen parallel to the axis of the venturi and a hydrogen line extending from a hydrogen tank to be described below (23 in FIG. 5) is connected to the nozzle 16. The nozzle may be additionally mounted on the outside of the stack manifold or may be combined with the stack manifold as one unit.

The ejector 17 is connected between the anode outlet 11 and the anode inlet 12 on the manifold body 13, such that hydrogen discharged to the anode outlet 11 can be recirculated and hydrogen can be supplied through the nozzle 16. For example, the ejector 17 having the venturi 14 and the diffuser 15 may be positioned horizontally on the manifold body 13, with a front end (upstream side) of the diffuser 15 directly connected to the anode inlet 12 of the manifold body 13 and a rear end (downstream side) of the venturi 14 connected to the anode outlet 11 of the manifold body 13, at an angle through a duct 18.

That is, the ejector 17 may be directly connected with the anode inlet 12 through the diffuser part, at the same height as the anode inlet 12 of the manifold body 13 and is connected with the anode outlet 12 at the lower portion through the venturi part and a duct 18 at an angle. Obviously, the duct 18 may also by integrally formed with the manifold body 13.

Accordingly, the recirculated hydrogen discharged from the anode outlet 11 can flow into the anode inlet 12 through the duct 18 and the ejector 17 and the hydrogen supplied from the nozzle 16 of the ejector 17 can also flow into the anode inlet 12.

The ejector 17, a kind of pump that absorbs and discharges fluid by generating a low-pressure area in its vicinity, when the fluid under pressure is sprayed at a high speed from the nozzle, is composed of the nozzle 16 that sprays primary fluid (hydrogen) under high pressure at a high speed, the venturi 14 that absorbs secondary fluid (anode exhaust gas), using the venturi effect, and mixes it with the primary fluid, and a diffuser 15 that decreases the speed and increases the pressure of fluid.

Accordingly, the kinetic energy of the primary fluid at a high speed is converted into kinetic energy of the entire fluid mixture in the venturi 14 and the speed is converted into pressure through the diffuser 15 with an increasing cross-section, such that the secondary fluid is discharged from the ejector outlet, at a higher pressure than when it is absorbed by the ejector 17, and then supplied to the anode inlet 12.

As a method of forming the manifold body 13 with the integrated ejector 17, molding and die casting may be used when the stack manifold is made of metal, or blow molding or injection molding may be used when the stack manifold is made of plastic.

Figure 4:
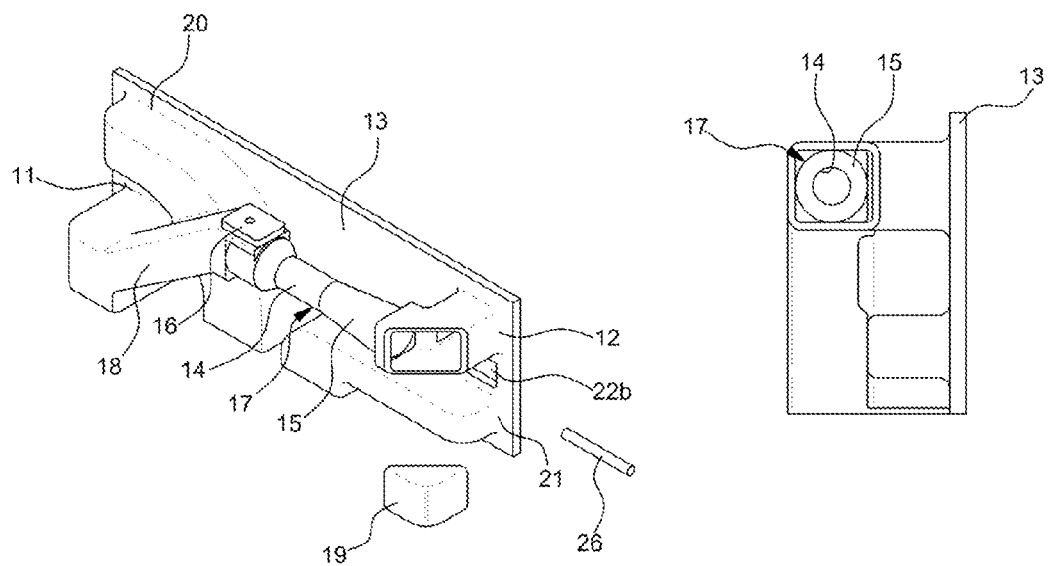
FIG. 4 is a perspective view showing an example for post-processing on a fuel cell stack manifold having an ejector function according to an exemplary embodiment of the present invention.

FIG. 4 is a perspective view showing an example for post-processing on a fuel cell stack manifold having an ejector function according to an embodiment of the present invention. As shown in FIG. 4, the surface of the venturi 14 and the diffuser 15 of the ejector 17 are additionally machined to make the quality better. For example, when the manifold 13 is formed, the front end of the diffuser 15 of the ejector 17 is partially cut, the inner sides of the venturi 14 and the diffuser 15 are machined by a machining tool 26 through the partially cut, and then the partially cut is finished by a cap 19.

That is, when additional machining is applied to make the surface quality better in the venturi/diffuser structure of the ejector, the structure is injection-molded with the channels partially cut (the joint of the diffuser and the anode inlet cut) and then the cap 19 having a channel shape is bonded after the machining, such that the aerodynamics characteristics can be improved.

Figure 5:
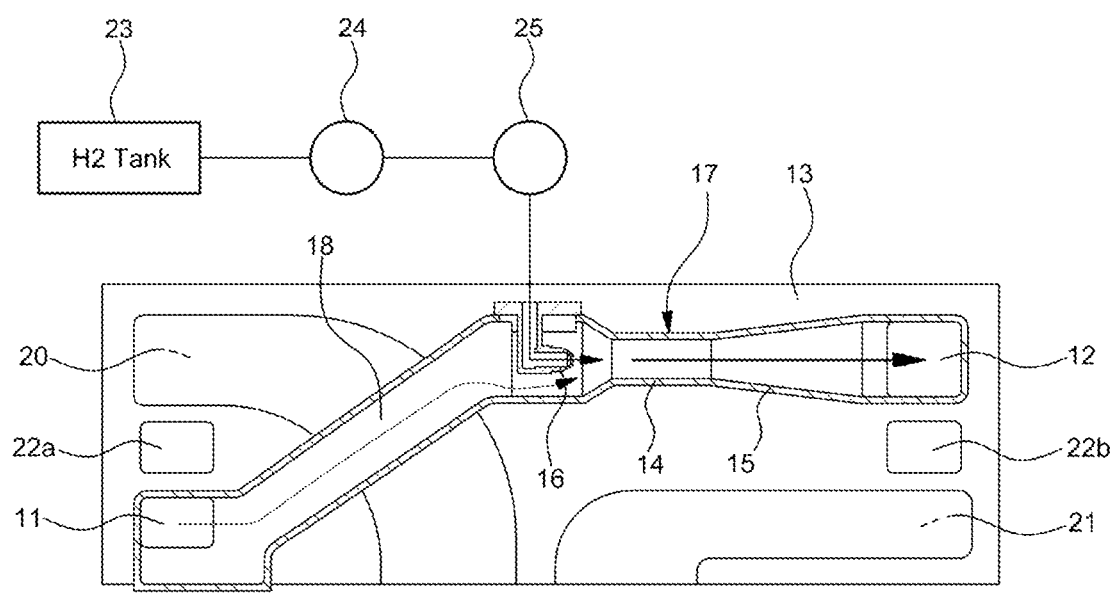
FIG. 5 is a cross-sectional view showing use of an installation status of a fuel cell stack manifold having an ejector function according to an exemplary embodiment of the present invention.

FIG. 5 is a cross-sectional view showing use of an installation status of a fuel cell stack manifold having an ejector function according to an embodiment of the present invention. As shown in FIG. 5, a hydrogen line from a hydrogen tank 23 to the nozzle 16 of the ejector 17 is provided and a regulator 24 and a flow control valve 25 are disposed in the hydrogen line.

Accordingly, the hydrogen supplied from the hydrogen tank 23 is sprayed at a high speed into the venturi 14 through the nozzle 16 and the recirculated hydrogen discharged from the anode outlet 11 also flows into the venturi 14 of the ejector 17 through the duct 18.

Accordingly, the kinetic energy of the hydrogen sprayed at a high speed from the nozzle 16 is converted into kinetic energy of the entire fluid mixture including the recirculated hydrogen in the venturi 14, the speed is converted into pressure through the diffuser 15 with an increasing cross-section, and the recirculated hydrogen is discharged from the ejector outlet, at a higher pressure than when it is absorbed by the ejector 17, and then supplied to the anode inlet 12.

As described above, in the present invention, it is possible to reduce the manufacturing cost and simplify the manufacturing process by integrally formed an ejector with a stack manifold.

For example, there are needs of forming/machining and examining of stack manifold, forming, machining, assembling, and examining of ejector, assembling of stack manifold and ejector, examining of airtightness, assembling of fuel processing system (FPS) in the related art, but there are needs of forming/machining of stack manifold→examining of airtightness, assembling of FPS in the related art, such that the number of processes can be reduced.

Further, since there is no joint between a stack manifold and an ejector, the portions that need to be made hermetic can be minimized. For example, airtightness was required at two positions on the venturi/diffuser joints of an ejector and one nozzle joint in the related art, but airtightness is required only at one nozzle joint in the related art, such that airtightness can be ensured accordingly.

Further, since the stack manifold and the ejector are integrally formed, freezing of the nozzle can be reduced in cold starting and the temperature rising speed can be increased. For example, the stack manifold is relatively higher in temperature than the FPS portion in contact with the cooling water and the stack (heat source) in cold starting, so it is more advantageous in cold starting.

Although embodiments of the present invention were described in detail above, the scope of the present invention is not limited to the embodiments and various changes and modifications from the spirit of the present invention defined in the following claims by those skilled in the art are also included in the scope of the present invention.

What is claimed is:

1. A fuel cell stack manifold having an ejector function, which is combined with a stack and supplies and distributes fuel, air, and cooling water for operating the stack, the fuel cell stack manifold comprising:
   a manifold body including an anode outlet and an anode inlet; and
   an ejector that connects the anode outlet and the anode inlet,
   wherein the ejector includes a venturi and a diffuser and is arranged on the manifold body and integrally formed with the manifold body,
   wherein the venturi includes a nozzle and a downstream side of the venturi is connected to the anode outlet of the manifold body through a duct,
   wherein the front end of the diffuser is connected to the anode inlet, and
   wherein the ejector forms an acute angle with the manifold body causing a curved flow direction from the ejector to the fuel cell stack.

2. The fuel cell stack manifold of claim 1, wherein a front end of the diffuser of the ejector is connected directly to the anode inlet of the manifold body and a rear end of the venturi is connected to the anode outlet of the manifold body through a duct.

3. The fuel cell stack manifold of claim 1, wherein the nozzle of the ejector is additionally mounted on an outside of a fuel cell stack or is integrally formed with the stack manifold.

4. The fuel cell stack manifold of claim 1, wherein the ejector including the venturi and the diffuser is arranged horizontally on the manifold body.

5. The fuel cell stack manifold of claim 1, wherein a front end of the diffuser of the ejector is partially cut and the partially cut is finished by a cap after the diffuser is machined.

6. The fuel cell stack manifold of claim 1, wherein the manifold body and the ejector integrally formed with the manifold body are formed by gravity casting or die casting, when they are made of metal.

7. The fuel cell stack manifold of claim 1, wherein the manifold body and the ejector integrally formed with the manifold body are formed by blow molding or injection molding, when the manifold body and the integrated ejector are made of plastic.

8. The fuel cell stack manifold of claim 1, wherein a rear end of the venturi and the anode outlet of the manifold body are connected through the duct at an angle.

* * * * *